No. 869,994.  
PATENTED NOV. 5, 1907.
R. P. THOMPSON & E. KOEB.  
STEERING MECHANISM FOR AUTOMOBILES.  
APPLICATION FILED OCT. 16, 1905.
2 SHEETS—SHEET 1.
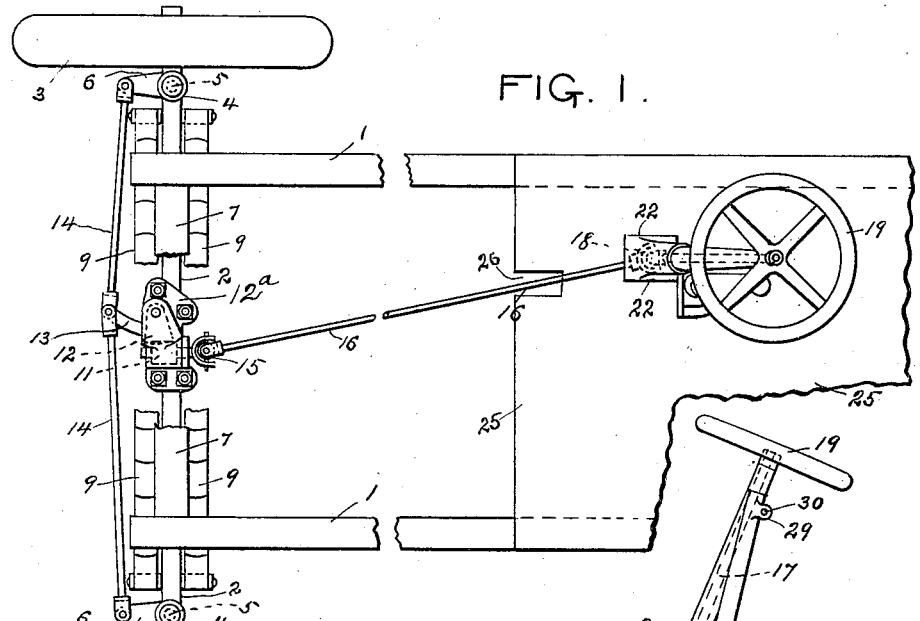
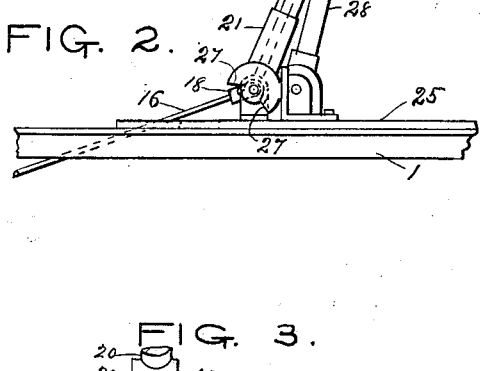
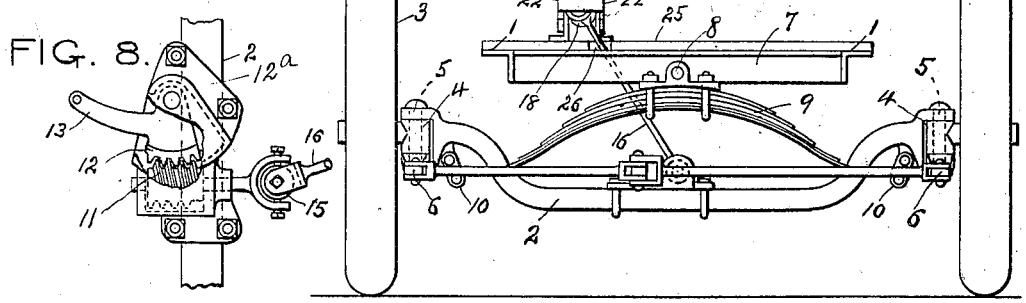
WITNESSES:  
William F. Bauer  
Ivone Miller
INVENTORS  
Ralph P. Thompson.  
Emil Koeb.  
BY H. A. Toulmin  
ATTORNEY.

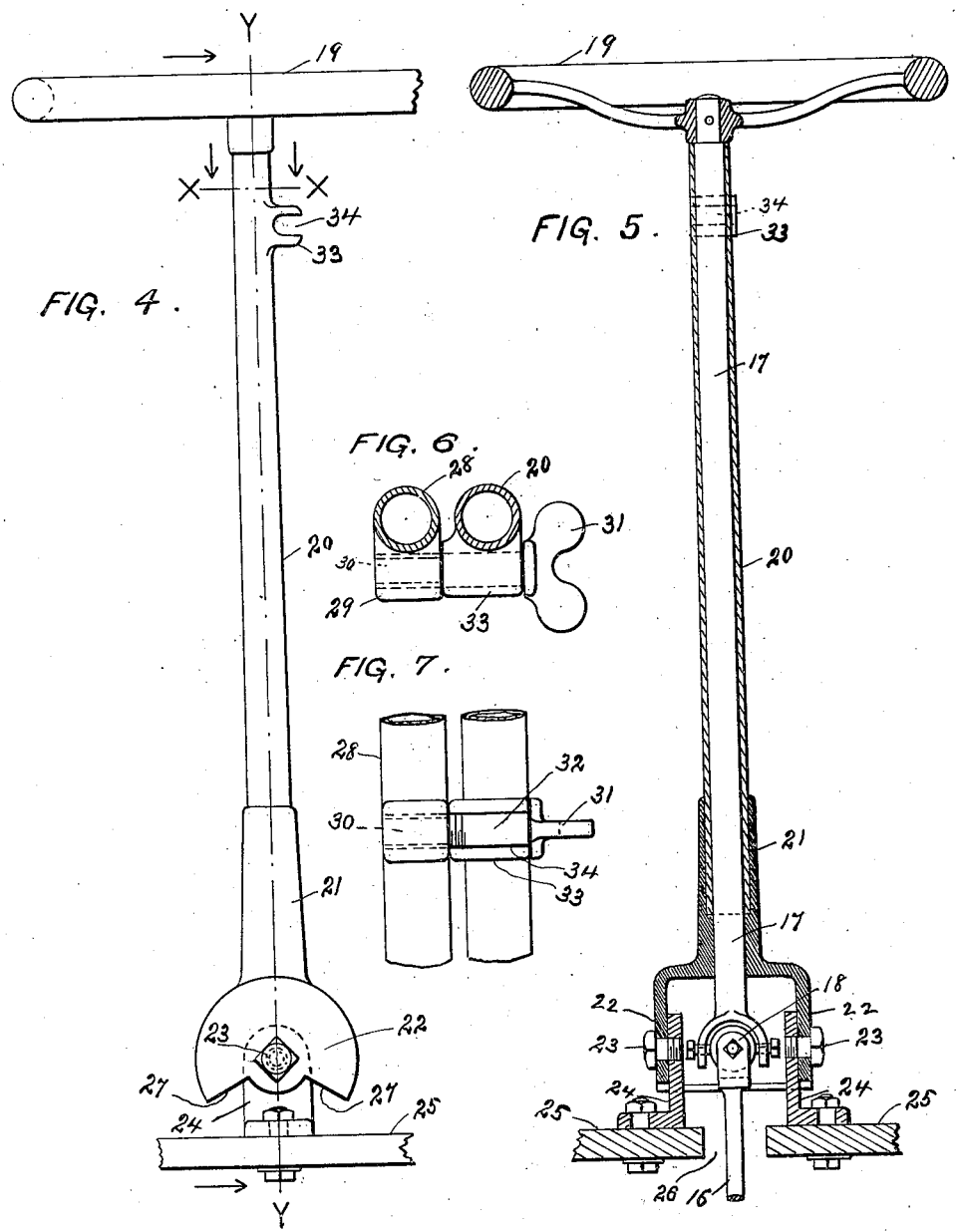

UNITED STATES PATENT OFFICE.

RALPH P. THOMPSON AND EMIL KOEB, OF SPRINGFIELD, OHIO.

STEERING MECHANISM FOR AUTOMOBILES.

No. 869,994.  Specification of Letters Patent.  Patented Nov. 5, 1907.

Application filed October 16, 1905. Serial No. 282,892.

*To all whom it may concern:*

Be it known that we, RALPH P. THOMPSON and EMIL KOEB, citizens of the United States, residing at Springfield, in the county of Clark and State of Ohio, have invented certain new and useful Improvements in Steering Mechanism for Automobiles, of which the following is a specification, reference being had therein to the accompanying drawings.

This invention relates to steering mechanism for automobiles, and has for its object to provide a simple, effective and accurate mechanism whereby motor vehicles may be readily and accurately guided.

To these ends our invention consists in certain novel features which we will now proceed to describe, and will then particularly point out in the claims.

In the accompanying drawings, Figure 1 is a plan view of a structure embodying our invention in one form; Fig. 2 is a side elevation of the same; Fig. 3 is a front elevation; Fig. 4 is a detail side elevation of the steering shaft and its bearing; Fig. 5 is a vertical sectional view, taken on the line $y\ y$ of Fig. 4 and looking in the direction of the arrows; Fig. 6 is a detail plan view of the locking mechanism; Fig. 7 is a rear elevation of the same; and Fig. 8 is a detail plan view of the worm and gear forming the steering gearing mounted on the front axle, the same being shown somewhat enlarged and with the inclosing casing broken away to show the internal construction.

In the said drawings, 1 indicates the main frame of an automobile, and 2 indicates the front axle thereof, provided with steering ground wheels 3. These latter are connected to the ends of the axle by the usual steering knuckles 4, having vertical pivots 5, and arms 6, by means of which the steering wheels can be turned. The axle is connected to the main frame by means of an interposed spring which permits said axle to vibrate or rock so as to enable it to accommodate itself to inequalities of the road. Any suitable connection may be employed for this purpose, but we prefer the construction illustrated, which is one which we have devised, and which is described and claimed in another application filed by us of even date herewith. In this construction the front cross piece 7 of the frame has pivotally connected to it at 8, by means of a pivot which is central and longitudinal with respect to the machine, two transverse springs 9, the pivotal connection being at the center of the springs. These springs are spaced apart so as to receive between them the axle 2, and the ends of the springs are connected to the ends of the axle in any suitable manner, as, for instance, by links 10.

Mounted upon the axle 2, and preferably at the central portion thereof, is a worm 11, which meshes with a worm gear segment 12, provided with an arm 13, which is connected by links or rods 14 with the arms 6 by which the position of the steering wheels is controlled. It will be observed that the worm 11 and gear 12 are mounted upon the axle, so that the distance between said worm gearing and the pivots 5 on which the steering wheels turn is always the same, being a fixed distance. By reason of this construction, the strains upon the connecting rods are reduced to a minimum, and the danger of breakage from this source is avoided, while no shocks or strains are transmitted to the gearing when the wheels are moved to different positions vertically by reason of the inequalities of the roadway. The worm gear segment 12 and the worm 11 may be connected to the axle 2 if desired, but we prefer to employ a supporting plate $12^a$ which is rigidly secured to the axle and to which the worm gear segment and the worm are secured, as the supporting plate affords a larger bearing surface and a better support for these parts.

The worm 11 is coupled at its rear end by a universal coupling 15 to the forward end of a flexible rod 16, which extends rearward towards the operator's seat. At this point is located the steering shaft 17, the lower end of which is coupled by a universal coupling 18 to the rear end of the rod 16. The upper end of the steering shaft is provided with the usual hand wheel 19. The shaft is mounted in a bearing sleeve 20, the lower end of which is secured in a socket piece 21, having parallel pivot plates 22 to receive pivot screws 23, which are secured to lugs 24, mounted on the floor 25, or any other suitable part supported by or forming part of the main frame. The floor is shown as provided with a slot or opening 26 for the passage of the rod 16. The pivot plates are shown as provided with stop shoulders 27, which, by their contact with the lugs 24, serve to limit the swinging movement of the steering shaft and its bearing sleeve, which, as usual in mechanism of this character, is arranged to swing forward and back longitudinally of the machine to facilitate the ingress and egress of the operator. It will be understood that the pivotal center of the universal coupling 18 is in alinement with the pivot screws 23, in order to permit this swinging movement.

For the purpose of locking the steering shaft and its bearing in operative position and at the same time permitting its ready release, we provide means for detachably connecting it to a fixed support 28, which is preferably the bearing sleeve of the controlling mechanism by which the fuel and air supply of the engine are controlled, as set forth in another application filed by us of even date herewith. This fixed support or bearing sleeve is provided with a threaded lug 29, in which is screwed a clamping bolt 30, having a head 31 by means of which it may be readily grasped and turned by the operator's fingers, and a shank portion 32 intervening between said head and the threaded portion of the bolt. The bearing sleeve 20 is provided with a lug 33, having an open mouth slot 34 which fits over the shank portion 32 of the bolt 30. When the steering shaft and its bearing are thrown back into operative position, as shown in Figs. 2, 6 and 7, the shank portion of the clamping bolt enters the slotted lug 33, and, by turning the bolt 30 in the proper direction, the lug 33 may be clamped between the lug 29 and the head of the clamping bolt. This operation may be readily performed, and the steering shaft may be as readily released by a slight turn of the clamping bolt in the opposite direction.

It will be noted that the flexible rod 16, which is preferably of steel or other resilient metal capable of bending, will accommodate itself to any changes in the relative position of the worm on the front axle and the steering shaft on the main frame, arising from the movements of the axle due to inequalities of the roadway, while the universal couplings will directly transmit the rotatory movement of the steering shaft to the worm, whatever their relative positions may be. Since the worm and its coöperating gear segment remain locked against relative movement through forces other than those provided for their actuation, it will be seen that the steering wheels will preserve any angle to which they may be adjusted relatively to their axle, since the worm gearing has, as already stated, a fixed relation relatively to the pivots of the steering wheels, and the said angular relations of the steering wheels to the axle are therefore not caused to vary by reason of movements of the axle relatively to the main frame.

We do not wish to be understood as limiting ourselves to the precise details of construction hereinbefore described and shown in the accompanying drawings, as it is obvious that these details may be modified without departing from the principle of our invention.

Having thus fully described our invention, what we claim as new and desire to secure by Letters Patent is:—

1. In an automobile, the combination, with a main frame and an axle provided with pivoted steering ground wheels and spring connected to the main frame so as to be movable relatively thereto, of a supporting plate rigidly secured to said axle, a worm gear segment pivoted to said supporting plate and operatively connected with the steering ground wheels, a worm carried by said supporting plate and meshing with said worm gear segment, and a controlling device supported on the main frame and operatively connected with said worm, substantially as described.

2. In an automobile, the combination, with a main frame, and an axle provided with pivoted steering ground wheels and spring-connected to the main frame so as to be movable relatively thereto, of a steering gearing mounted on said axle and operatively connected with the steering ground wheels, a steering shaft supported on the main frame, and a flexible rod provided with universal couplings whereby its ends are connected to said steering gearing and steering shaft, substantially as described.

3. In an automobile, the combination, with a main frame, and an axle provided with pivoted steering ground wheels and spring-connected to the main frame so as to be movable relatively thereto, of a steering gearing mounted directly on said axle and comprising a lever pivoted to said axle and having one end operatively connected with the steering ground wheels, a toothed segment on the oposite end of said lever, a worm meshing therewith, a steering shaft mounted on the main frame, and a flexible rod provided with universal couplings whereby its ends are connected to the steering shaft and worm, substantially as described.

4. In a steering mechanism for automobiles, the combination, with a steering shaft having a steering hand wheel, of a bearing sleeve for said shaft provided with pivot plates having stop shoulders, and fixed pivot lugs to which said pivot plates are pivotally connected, said lugs being arranged in the path of the stop shoulders, substantially as described.

5. In a steering mechanism for automobiles, the combination, with a fixed support having a clamping bolt threaded therein, of a steering shaft provided with a steering wheel, and a bearing sleeve for said steering shaft pivoted to swing in a vertical plane, said bearing sleeve being provided with a lug having an open-mouthed slot adapted to receive that portion of said clamping bolt lying between its head and the part into which it is threaded, substantially as described.

In testimony whereof, we affix our signatures in presence of two witnesses.

RALPH P. THOMPSON.
EMIL KOEB.

Witnesses:
IRVINE MILLER,
T. J. McCORMICK.